United States Patent
Stewart et al.

(10) Patent No.: US 7,099,103 B2
(45) Date of Patent: Aug. 29, 2006

(54) METHODS FOR CONTROLLING THE USE OF A CLEANING CARTRIDGE FOR TAPE DRIVES

(75) Inventors: Alexander Stewart, Louisville, CO (US); Stephen W. Smith, Upton, MA (US); Christopher P. King, Brimfield, MA (US); Set B. Chau, Northridge, CA (US); Lee V. Jaderborg, Frederick, CO (US)

(73) Assignee: Quantum Corporation, San Jose, CA (US)

( * ) Notice: Subject to any disclaimer, the term of this patent is extended or adjusted under 35 U.S.C. 154(b) by 126 days.

(21) Appl. No.: 10/820,388

(22) Filed: Apr. 7, 2004

(65) Prior Publication Data

US 2005/0105202 A1    May 19, 2005

Related U.S. Application Data

(60) Provisional application No. 60/520,098, filed on Nov. 14, 2003.

(51) Int. Cl.
  *G11B 15/18*  (2006.01)
  *G00B 19/02*  (2006.01)
  *G11B 15/48*  (2006.01)

(52) U.S. Cl. .................................. 360/72.3; 360/71

(58) Field of Classification Search .............. 360/72.3, 360/71
See application file for complete search history.

(56) References Cited

U.S. PATENT DOCUMENTS

| 4,594,617 | A  | * | 6/1986 | Tezuka ..................... 360/73.01 |
| 4,631,614 | A  |   | 12/1986 | Davis et al. |
| 5,381,292 | A  | * | 1/1995 | Richmond .................. 360/128 |
| 6,021,026 | A  |   | 2/2000 | Dallago |
| 6,292,330 | B1 |   | 9/2001 | Thiessen et al. |
| 2003/0169529 | A1 | | 9/2003 | Shiratori et al. |

OTHER PUBLICATIONS

Author Unknown (Oct. 14, 2003). "Quantum Delivers New Tape Drive Performance Threshold with Enterprises Sized Speed, Manageability and Capacity," press release located at <http:www.quantum.com/AM/news/releases>, last visited on Nov. 11, 2003, 5 pages total.

* cited by examiner

*Primary Examiner*—Wayne Young
*Assistant Examiner*—Jason Olson
(74) *Attorney, Agent, or Firm*—Morrison & Foerster LLP

(57) ABSTRACT

In one exemplary aspect of the present invention a method for cleaning a media drive transducer head is provided. The method includes transporting a portion of a cleaning tape over a transducer head under a first set of conditions, the first set of conditions associated with a cleaning process of the transducer head, and transporting the portion of the cleaning tape over the transducer head under a second set of conditions, the second set of conditions associated with a writing process.

21 Claims, 3 Drawing Sheets

METHODS FOR CONTROLLING THE USE OF A CLEANING CARTRIDGE FOR TAPE DRIVES

CROSS REFERENCE TO RELATED APPLICATIONS

The present application claims the benefit of earlier filed U.S. Provisional Application No. 60/520,098, filed on Nov. 14, 2003, and entitled "METHODS FOR CONTROLLING THE USE OF A CLEANING CARTRIDGE FOR TAPE DRIVES," the disclosure of which is hereby incorporated by reference in its entirety herein.

BACKGROUND OF THE INVENTION

1. Field of the Invention

The present invention relates generally to cleaning cartridges and associated methods for cleaning media drives, and more particularly to methods of controlling cleaning cartridges in media drives.

2. Description of the Related Art

Magnetic tape cartridges have proven to be an efficient and effective medium for data storage in computer systems. Magnetic tape cartridge storage systems generally include one or more tape cartridges housing a tape coated with a magnetic medium and one or more tape drives. A tape drive typically includes a data transducer, e.g., a read and/or write head, and various control electronics for writing data to the magnetic tape and reading data from the magnetic tape and for moving the data transducer laterally with respect to the tape.

The data transducer heads in the media drive may experience a build up of debris or contaminants over time. The build up of debris on the data transducer heads may cause a decrease in performance or damage to the tape drive and/or tape cartridge. Various devices and methods for cleaning transducer heads have been provided. For example, a cartridge housing a cleaning tape, commonly referred to as a "cleaning cartridge," may be used. A cleaning cartridge may include a tape that is manufactured with particular mechanical and/or chemical properties that provide for increased abrasiveness to clean debris from the transducer head of the drive. The cleaning cartridge may be loaded into the tape drive and spooled across a transducer head thereby removing debris and contaminants. Further, during a cleaning process, the transducer head may be moved laterally up and down with respect to the direction of tape transport to further enhance the cleaning process.

Generally, only a portion of the length of the cleaning tape in a cleaning cartridge is used in a single cleaning process, and it is typically undesirable to reuse the same portion of a cleaning tape more than a certain number of times. Therefore, one method of cleaning transducer heads includes writing data to the cleaning tape during a cleaning process to indicate which portions of the cleaning tape have been used. The data may be read before a subsequent cleaning process to eliminate the potential of reusing the same portion of the cleaning tape. A drawback of this method includes that the optimum speed for cleaning a transducer head is significantly slower than the optimum speed for writing data to the cleaning tape. Accordingly, this method may sacrifice cleaning efficiency by operating at speeds suitable for reading and writing to the cleaning tape.

BRIEF SUMMARY

In one aspect of the present invention, a method for cleaning a media drive transducer head is provided. In one example, the method includes transporting a portion of a cleaning tape over a transducer head under a first set of conditions, the first set of conditions associated with a cleaning process of the transducer head, and transporting the portion of the cleaning tape over the transducer head under a second set of conditions, the second set of conditions associated with a writing process. The first set of conditions and the second set of conditions may vary at least in the speed of the cleaning tape relative to the transducer head; for example, a relatively slower tape speed during the cleaning process than during the writing process.

The example may further include determining a longitudinal end of data on the cleaning tape prior to transporting the portion of the cleaning tape over the transducer head under the first set of conditions, where the data is associated with a previous cleaning process. The portion of the cleaning tape transported over the transducer head under the first set of conditions associated with the cleaning process may be located adjacent the longitudinal end of data on the cleaning tape.

In another aspect of the present invention, a method for cleaning a media drive transducer head including a directory region is provided. The method includes writing a data segment to a first portion of a cleaning tape under a first set of conditions, and cleaning a transducer head with a second portion of the cleaning tape under a second set of conditions. The data segment is associated with the position of the second portion of the cleaning tape, and the second set of conditions vary from the first set of conditions. For example, the speed of the cleaning tape under the first set of conditions is greater than the speed of the cleaning tape under the second set of conditions. The exemplary method may further include writing a plurality of data segments to a first portion of the cleaning tape, where the plurality of data segments are associated with a plurality of cleaning segments of the cleaning tape.

According to other aspects of the present invention, media drives configured to carry out the exemplary methods and/or computer readable media including computer readable code to carry out the exemplary methods are provided.

The present invention and its various embodiments are better understood upon consideration of the detailed description below in conjunction with the accompanying drawings and claims.

DETAILED DESCRIPTION

Figure 2:
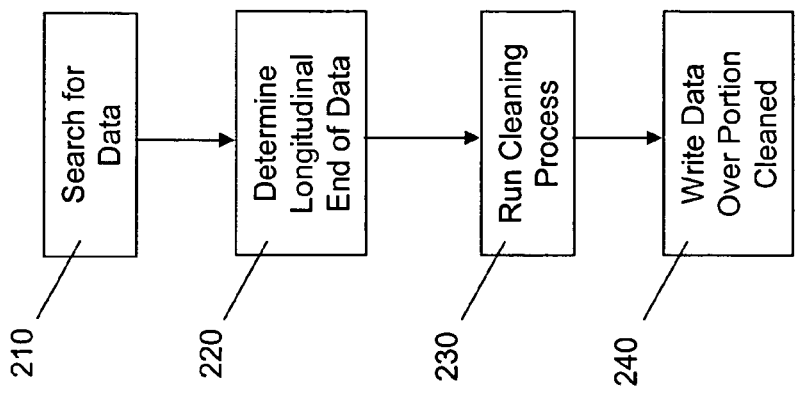
FIG. 2 is a block diagram illustrating an exemplary method for controlling a cleaning tape during a cleaning process.

Exemplary cleaning tapes and associated methods of controlling the use of cleaning tapes in media drives are provided. The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

Cleaning cartridges for use in tape drives commonly use a special tape that is manufactured with particular mechanical and/or chemical properties that provide increased abrasiveness to clean debris from the recording head of the drive. Typically, the basic material used for the cleaning tape may also be used to record data that can be written and read, at least to some extent, by the drive being cleaned. For example, cleaning processes for exemplary media drives, such as DLT™ and SDLT™ drives sold by Quantum Corporation, record and read data to and from a cleaning tape during the cleaning process to indicate portions of the tape that have been used during previous cleaning processes. Accordingly, the cleaning tape is moved at a speed compatible with reading and writing in the drive during the cleaning process. The conditions for reading and writing, however, generally do not provide an optimum or efficient speed for cleaning the transducer heads. Further, because the drive must also be able to locate and read data written on the cleaning tape while cleaning without the use of servo or other aids to locating position, the ability of the drive to move the head relative to the cleaning tape during cleaning is also limited.

Other exemplary media drives, such as LTO™ drives sold by a number of suppliers, which are compatible with cartridges having a Medium Auxiliary Memory (MAM) device, are able to vary the tape speed and transducer head motion for cleaning and store information regarding the history of the cleaning tape because the MAM device allows data to be written to the cartridge independently of the tape drive's head and normal write/read circuitry. Still other exemplary media drives may use an algorithm optimized for cleaning, but are unable to write data to the cleaning tape and track usage of the cartridge since the tape speed is too low to read and/or write data. The usage of the cleaning cartridge must be tracked manually and the same area of the cartridge could inadvertently be used over and over again.

In one aspect of the present invention, methods are provided for controlling a cleaning tape in a media drive where the cleaning process and the read/write process are separated. In one example, the cleaning process and the read/write process are separated such that a cleaning cartridge may be operated under one set of conditions, e.g., a cleaning tape speed and relative head motion, that maximizes or increases the performance of the cleaning action of the tape, while also operating at another set of conditions, e.g., a speed and head motion, that allows the drive to record and read back data associated with the usage of the cleaning tape.

Figure 1:
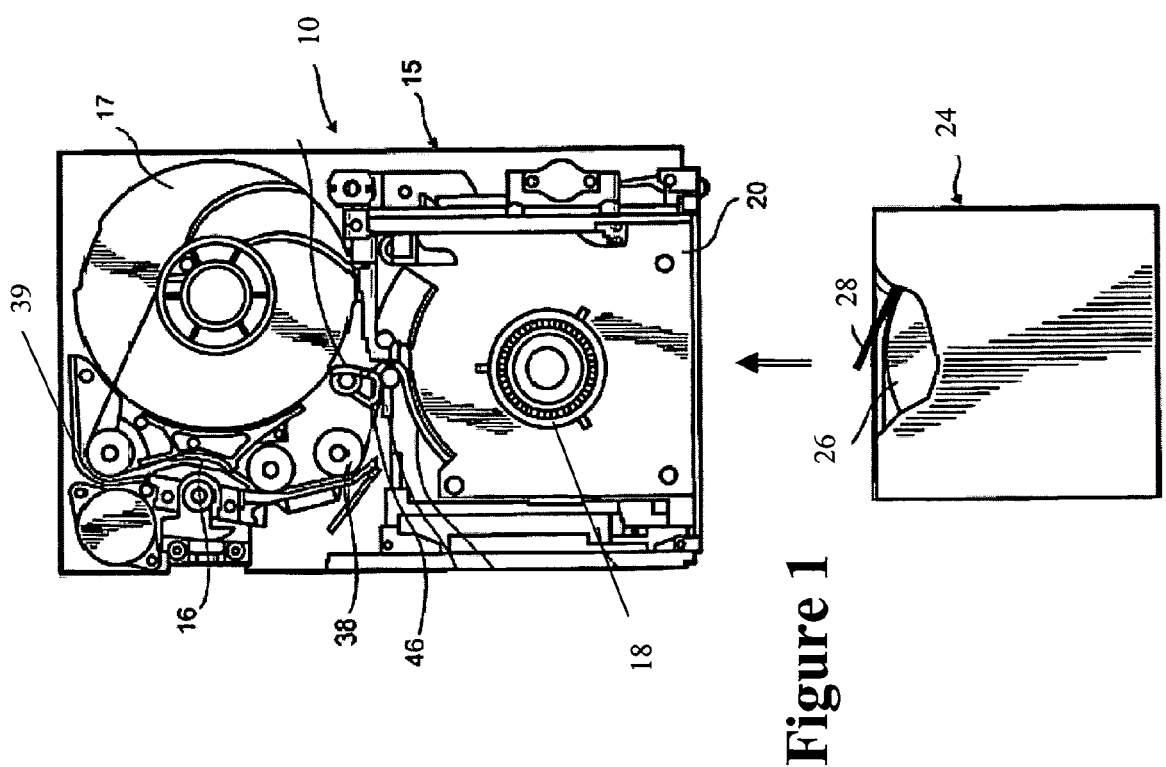
FIG. 1 illustrates an exemplary media drive and an exemplary cleaning cartridge housing cleaning tape.

Referring initially to FIG. 1, an exemplary tape drive 10 is illustrated that may be used with an exemplary cleaning cartridge 24. Tape drive 10 is typically installed within or associated with a computer system (not shown) or computer network. Tape drive 10 includes a tape drive housing 15, a data transducer, i.e., read and/or write head 16, a take-up reel 17, and a receiver slot 20. Tape drive 10 is used in conjunction with cleaning cartridge 24 which houses a cleaning tape 28 on supply reel 26. Receiver slot 20 is configured to receive a suitable cleaning cartridge 24 therein adjacent reel driver 18. Tape drive 10 may also include a door and various mechanisms for receiving and ejecting cleaning cartridge 24. When cleaning cartridge 24 is received in receiver slot 20 a buckler motor 46 or the like may engage a cartridge leader and stream cleaning tape 28 along a tape path within tape drive 10 passing read/write head 16 and onto take-up reel 17. The tape path may include various tape guides 39, rollers 38, one or more read/write heads 16, and the like before being wound upon take-up reel 17.

Cleaning cartridge 24 generally includes a substantially rectangular cartridge housing which encloses cartridge reel 26 and cleaning tape 28. Cleaning cartridge 24 may further include a cartridge door to protect cleaning tape 28 therein and a cartridge leader (not shown), which is exposed when the door is open. Cleaning tape 28 is adapted to clean read/write head 16. In one example, cleaning tape 28 is designed to be more abrasive than a normal data tape in order to remove debris and contaminants as cleaning tape 28 passes over read/write head 16. In one example, cleaning tape 28 is designed with similar characteristics as a typical data tape so as not to create any tribological anomalies between the cleaning tape and the transducer head. The differences between cleaning tape 28 and a typical data tape are generally only in the abrasive effect, and are achieved by adding a higher percentage of abrasive material (e.g., aluminum oxide) and/or by modifying the coating process to create a rougher surface. Cleaning tape 28 may also store information in a form, e.g., digital, that may be subsequently retrieved if desired. In one example, cleaning tape 28 has the same width as a typical data tape, e.g., approximately one-half inch in width for one media drive example, but larger and smaller widths are contemplated, e.g., 4–8 mm, to match the tape width for other tape drive technologies. Cleaning tape 28 may have a thickness of approximately 0.36 mils (0.00036 inches), but thicker and thinner tapes are contemplated.

With reference to FIG. 2, an exemplary method for controlling a cleaning cartridge to clean a media drive is provided. In this example, a method of separating the process of writing/reading data from the area of a cleaning tape used for cleaning and the process of cleaning are provided. Separating the process of writing/reading data from the process of cleaning advantageously allows for varying conditions during the writing/reading process and the cleaning process. For example, the cleaning tape speed and relative transducer head motion in the writing process and the cleaning process may be controlled to more effectively or efficiently write and clean respectively. In the present example, data, e.g., a tone or the like, is written to the cleaning tape over segments or portions of the cleaning tape that have been used previously in a cleaning process. In one example, a tone includes a specified repeating sequence of ones and zeroes written on the cleaning tape that provides a characteristic frequency in a readback signal that is easily detected and recognized by the control electronics of the drive.

A cleaning cartridge is inserted into the drive and the drive locates and reads a tone pattern written in prior cleaning operations (if any) in block 210. The drive may operate under suitable conditions, e.g., speed, to read the tone pattern. The drive then determines the longitudinal position along the tape where the written tone is no longer present as indicated in block 220. The drive uses the written data and end position information to determine where an unused portion of the cleaning tape begins and is available for a cleaning process. The cleaning process, e.g., using a suitable cleaning algorithm or the like, may then proceed with the unused portion of the cleaning tape in block 230. The cleaning process may be performed under suitable conditions, e.g., tape speed and with head motion, for a cleaning process. For example, the tape speed may be substantially slower for the cleaning process than the reading/writing process. In one example, during a read/write process the cleaning tape is moved at a rate of approximately 120 inches per second or more, and during a cleaning process the cleaning tape is moved at a rate of approximately 10 to 50 inches per second.

When the cleaning operation is complete, the drive repositions the tape back to the start of the cleaning segment just used, positions the head at the transverse location of the cleaning tape to write the tone, and writes the tone over the length of the cleaning segment used in block 240. After the tone is written, the cleaning tape may be fully rewound and unloaded from the drive.

In an initial cleaning process, if no tone is located in block 210, the drive may begin from the beginning of the cleaning tape. Of course, in other examples, a small tone may be formatted to the cleaning tape for an initial reference position on the cleaning tape.

Those of ordinary skill in the art will recognize that the present exemplary methods may be performed with fewer or additional actions, and the various actions may be carried out in other orders or in parallel. For example, a new or unused portion of a cleaning tape may be written to with data (block 240) prior to using that portion of the cleaning tape in the cleaning process (block 230). Further, the exemplary methods described herein may be carried out in software, firmware, hardware, or combinations thereof and included, e.g., in at least one of the media drive and associated computer system or network. The exemplary methods may also be included in a computer readable storage medium containing computer executable code.

In another aspect of the invention, cleaning tapes and methods for controlling cleaning tapes are provided wherein a directory or writing portion is included on a portion of the cleaning tape. In one example, the processes of cleaning and identifying usage of the cleaning tape are separated by writing to a separate short directory area on the cleaning tape, for example, at the start of the cleaning tape. The directory area includes data associated with the history or usage of the cleaning tape. In the directory area, the tape is moved at the normal speed used for reading and writing and the head typically is held in a fixed nominal position so that the drive, when reading, can easily locate the written data without the aid of a servo or of complex search algorithms. In the cleaning area of the cleaning tape, the cleaning tape can be moved at a rate desired for cleaning processes (typically a slow speed, e.g., 10 to 50 inches per second) and the head can be moved transversely across the tape when it is either stationary or moving to enhance the cleaning activity.

Figure 3:
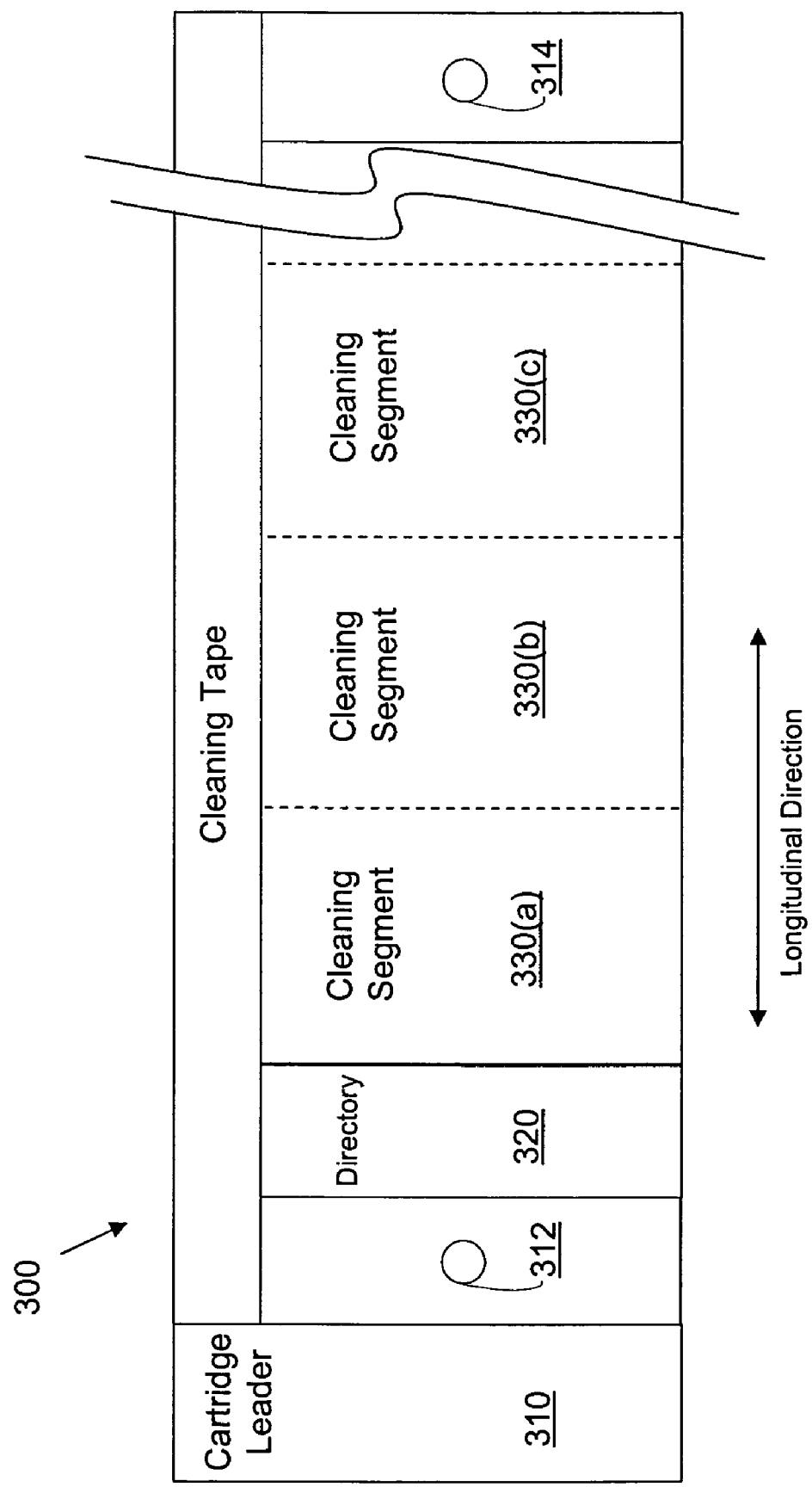
FIG. 3 is a block diagram illustrating an exemplary format of a cleaning tape.

FIG. 3 is a block diagram illustrating a region of a cleaning tape 300 utilized for cleaning a media drive head in accordance with various examples of the present invention. Cleaning tape 300 includes a cartridge leader 310, a beginning of tape hole 312, directory region 320, at least one cleaning segment 330(a, b, c, . . . ), and an end of tape hole 314.

At the beginning of cleaning tape 300 is the cartridge leader 310. Cartridge leader 310 is adapted to couple to a buckle mechanism for coupling with a drive leader of a tape drive and is not used to store data or clean a transducer head. A beginning of tape hole 312 is included after cartridge leader 300, which may provide a longitudinal reference indicating the start of the tape and may also differentiate various tape formats. For example, cleaning tape 300 may be distinguished from a typical storage data tape according to the number and/or pattern of holes. Next is a directory region 320, which stores directory data used to enable a tape drive to determine the cleaning history of segments 330(a, b, c, . . . ). A calibration region (not shown) may also be provided before the directory region 320 for assisting the tape drive in its initial calibration process.

It will be noted that FIG. 3 is not to scale; in typical cleaning tape cartridges, the user cleaning segments 330(a, b, c, . . . ) will consume the vast majority of the length of the cleaning tape 300. Further, to increase the use of the cleaning tape surface, the writing area, e.g., directory region 320, uses only a small portion of cleaning tape 300.

In one example, a portion of cleaning tape 300 is designated for the directory region 320 and subdivided into a number of segments equal to the number of times the cleaning tape is desirably used. The cleaning area of cleaning tape 300 is similarly subdivided into a number of cleaning segments 330(a, b, c, . . . ) according to the information in directory region 320, although a cleaning segment 330(a, b, c, . . . ) will normally be much longer than a directory segment.

In one exemplary method, when cleaning tape 300 is first used, the drive head is placed in a nominal fixed position and the head looks for data (a new cleaning tape will typically be manufactured with no data pre-written on it). Since no data is present, cleaning tape 300 will be rewound with the head in the same fixed position and data will be written for the length of a first directory segment in directory region 320. Information from a tachometer roller or from the motor hall-effect switches, for example, can be used to control the length of the directory segment. The drive then positions cleaning tape 300 at the start of a first cleaning segment 330(a) and moves cleaning tape 300 and the head in accordance with a pre-defined cleaning algorithm, for example. Cleaning tape 300 is rewound when the cleaning process is complete and may be unloaded from the drive.

During the second (and subsequent) use of cleaning tape 300, the drive positions the head at the same fixed position in the directory region 320, reads the previously written data and, by detecting the presence of that data, determines that cleaning tape 300 has been used before and the first cleaning segment 330(a) of the media should be skipped. The drive will then position cleaning tape 300 at the end of the first directory segment after determining the section has not been used and write the second directory segment. The drive will then move along cleaning tape 300 to the nominal position of the start of the second cleaning segment 330(b) and perform a cleaning process. This process may continue until all segments 330(a, b, c, . . . ) of cleaning tape 300 have been used.

It will be recognized by those of ordinary skill in the art that various modifications may be made to the cleaning tape 300 and the above exemplary methods. For example, directory region 320 may be located in other areas on cleaning tape 300 and may be disposed in non-congruent locations separated by cleaning segments 330(a, b, c, . . . ) or the like. Cleaning segments 330(a, b, c, . . . ) may partially or fully overlap with adjacent segments including the directory region 320. Further, cleaning segments 330(a, b, c, . . . ) may be used for a cleaning process more than once depending on the particular application.

Figure 4:
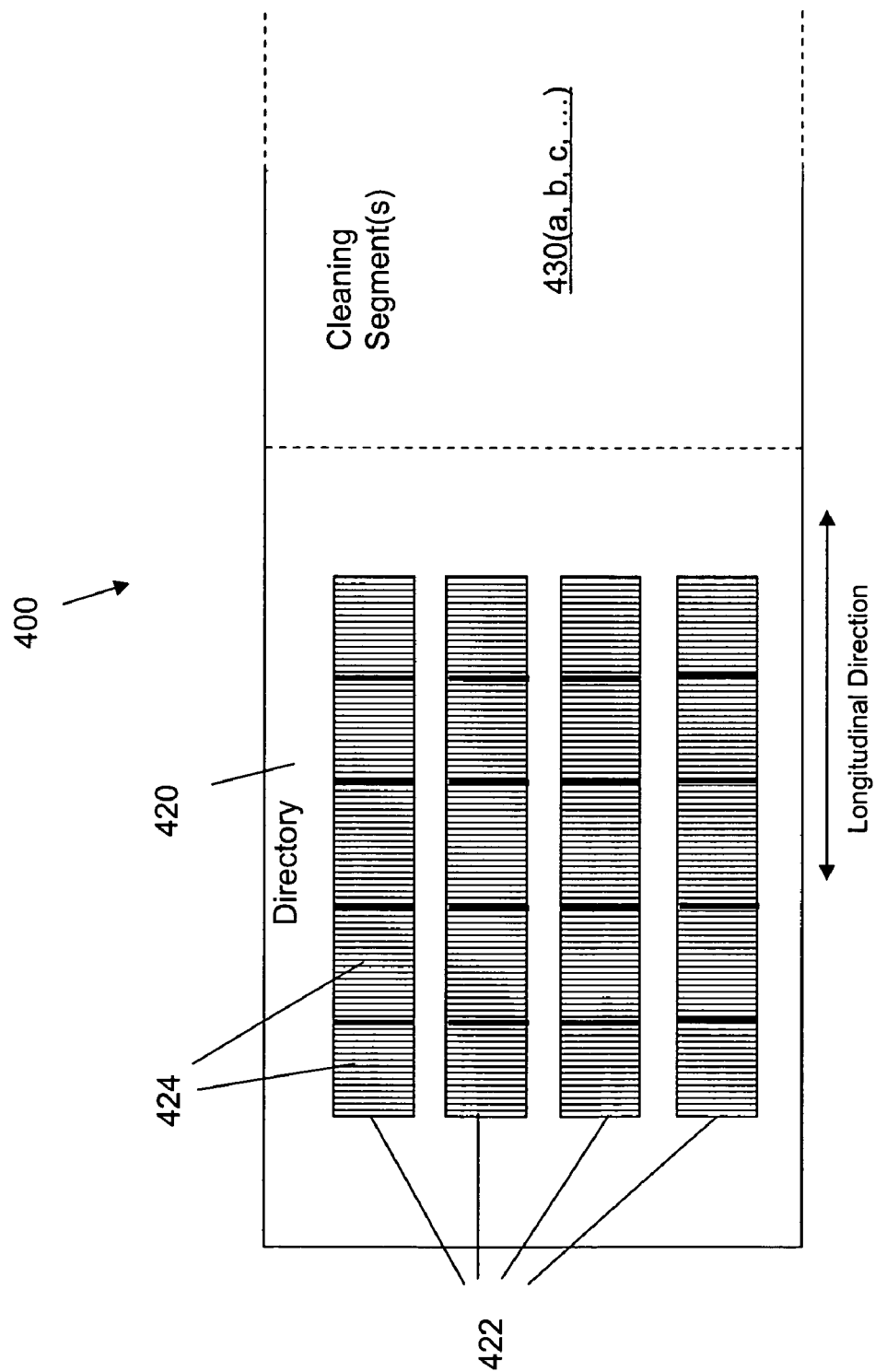
FIG. 4 illustrates an exemplary directory format of a cleaning tape.

With reference now to FIG. 4, an exemplary method for writing to the directory region is provided. The exemplary method may improve the ability of the media drive to detect the written directory segments and also to reduce the overall length of cleaning tape used for the directory region, thereby freeing up more area for cleaning segments. In this example, a number of serpentine transverse bands 422 are employed for use in directory region 420. For example, if 20 directory segments 424 are desired, four vertical bands 422 may be employed with five directory segments 424 in each band 422. The inclusion of bands 422 shortens the directory region 420 by a factor of four and allows more tape length for cleaning. Alternatively, any number of bands 422 are contemplated.

In one example, the widths of the vertical bands 422 are set so that the width of each band 422 is sufficiently greater than any uncertainty in the drive positioner system, e.g., positioning mechanism tolerance, zero datum tolerance, lateral tape motion, and the like. The feature may assist a drive in locating and reading the data in directory region 420. For example, as each segment 424 is being written, the head is positioned at the lower end of the band 422 and stepped progressively upwards so that it reaches the upper end of the band by the end of the segment 422. When the drive attempts to read the directory, it is positioned at the nominal band center so that it has much greater tolerance in detecting the data and complex search algorithms are not necessarily required.

Exemplary methods described herein may reduce the cost of cleaning cartridges because the cartridges may advantageously use varying conditions during the cleaning process and the read/write process without the need of auxiliary memory such as MAM. Further, some of the exemplary methods (e.g., writing a tone) allow the same cleaning tape to be used interchangeably in drives that use conventional cleaning algorithms.

The above detailed description is provided to illustrate exemplary embodiments and is not intended to be limiting. It will be apparent to those skilled in the art that numerous modifications and variations within the scope of the present invention are possible. Throughout this description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. A method for cleaning a media drive transducer head, comprising:
   determining a longitudinal end of data on a cleaning tape, the data associated with a previous cleaning process;
   transporting a portion of the cleaning tape over a transducer head under a first set of conditions, the first set of conditions associated with a cleaning process of the transducer head; and
   transporting the portion of the cleaning tape over the transducer head under a second set of conditions, the second set of conditions associated with a writing process.

2. The method of claim 1, wherein the portion of the cleaning tape transported over the transducer head under the first set of conditions associated with the cleaning process is located adjacent the longitudinal end of data on the cleaning tape.

3. The method of claim 1, wherein the set of conditions and the second set of conditions vary at least in speed of the cleaning tape relative to the transducer head.

4. The method of claim 1, wherein the speed of the cleaning tape under the first set of conditions is less than the speed of the cleaning tape under the second set of conditions.

5. The method of claim 1, wherein the transducer head is moved according to a predefined algorithm under the first set of conditions.

6. The method of claim 1, wherein the writing process includes writing data to the portion of the cleaning tape used in the cleaning process.

7. The method of claim 1, wherein a tone is written during the writing process.

8. A computer readable medium including computer executable code to carry out the method of claim 1.

9. A method for cleaning a media drive transducer head, comprising:
   writing a data segment to a first portion of a cleaning tape under a first set of conditions; and
   transporting a second portion of the cleaning tape over a transducer head under a second set of conditions associated with a cleaning process, wherein
   the data segment indicates that the second portion of the cleaning tape has been used for the cleaning process, and
   the second set of conditions varies from the first set of conditions.

10. The method of claim 9, further including writing a plurality of data segments to the first portion of the cleaning tape, the plurality of data segments associated with a plurality of cleaning segments of the cleaning tape.

11. The method of claim 10, wherein the plurality of data segments are written in at least two bands disposed laterally in the first portion of the cleaning tape.

12. The method of claim 9, wherein the speed of the cleaning tape under the first set of conditions is greater than the speed of the cleaning tape under the second set of conditions.

13. The method of claim 9, wherein the transducer head is moved according to a predefined algorithm under the second set of conditions.

14. The method of claim 9, wherein the first portion of the cleaning tape is located adjacent the beginning of the cleaning tape.

15. A computer readable medium including computer executable code to carry out the method of claim 9.

16. A media drive system, comprising:
   a media drive;
   a transducer head; and a drive reel adapted to transport a cleaning tape over the transducer head, wherein, the media drive is configured to:
   determine a longitudinal end of data on the cleaning tape, the data associated with a previous cleaning process,
   transport a portion of the cleaning tape over the transducer head under a first set of conditions, the first set of conditions associated with a cleaning process of the transducer head, and
   transport the portion of the cleaning tape over the transducer head under a second set of conditions, the second set of conditions associated with a writing process.

17. The media drive system of claim 16, wherein the portion of the cleaning tape transported over the transducer head under the first set of conditions associated with the cleaning process is located adjacent the longitudinal end of data on the cleaning tape.

18. The media drive system of claim 16, wherein the first set of conditions and the second set of conditions vary at least in the speed of the cleaning tape relative to the transducer head.

19. A media drive, comprising:

a media drive;

a transducer head; and a drive reel adapted to transport a cleaning tape over the transducer head, wherein, the media drive is configured to:

write a data segment to a first portion of the cleaning tape under a first set of conditions, transport a second portion of the cleaning tape over the transducer head under a second set of conditions associated with a cleaning process, wherein the data segment indicates that the second portion of the cleaning tape has been used for the cleaning process, and the second set of conditions varies from the first set of conditions.

20. The media drive of claim 19, wherein the media drive is further configured to write a plurality of data segments to the first portion of the cleaning tape, the plurality of data segments associated with a plurality of cleaning segments of the cleaning tape.

21. The media drive of claim 19, wherein the speed of the cleaning tape under the first set of conditions is greater than the speed of the cleaning tape under the second set of conditions.

* * * * *